T. VAN TUYL.
SUPPLY AND FEED SYSTEM FOR HYDROCARBON ENGINES.
APPLICATION FILED DEC. 19, 1910.
1,098,138.                                                                 Patented May 26, 1914.
2 SHEETS—SHEET 2.
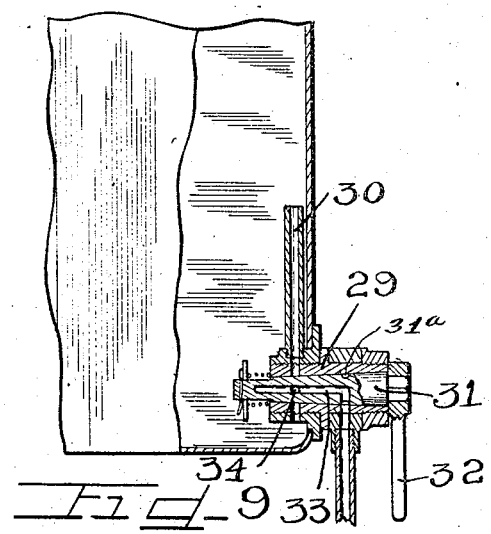
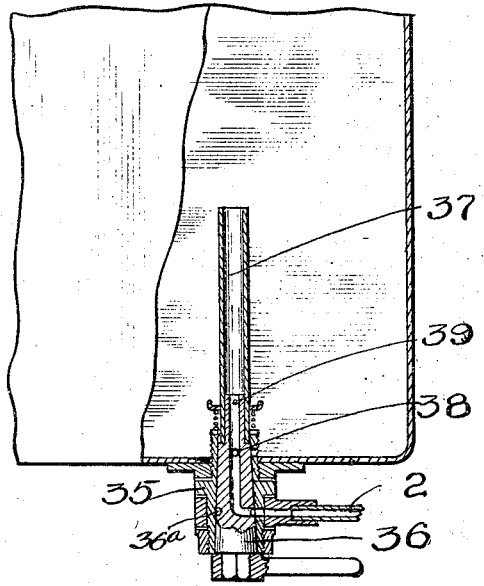
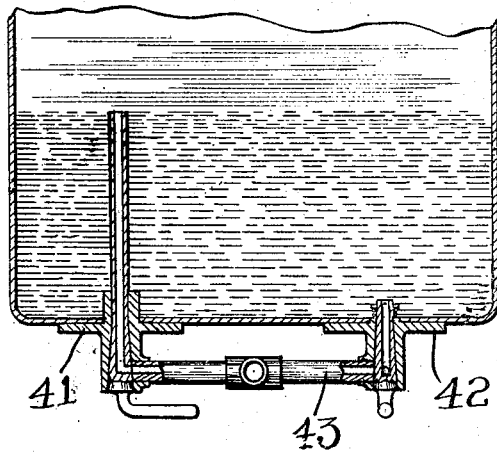
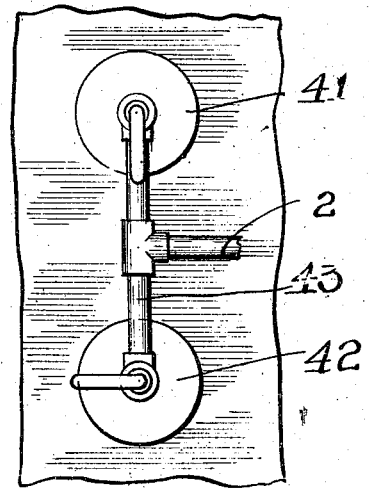

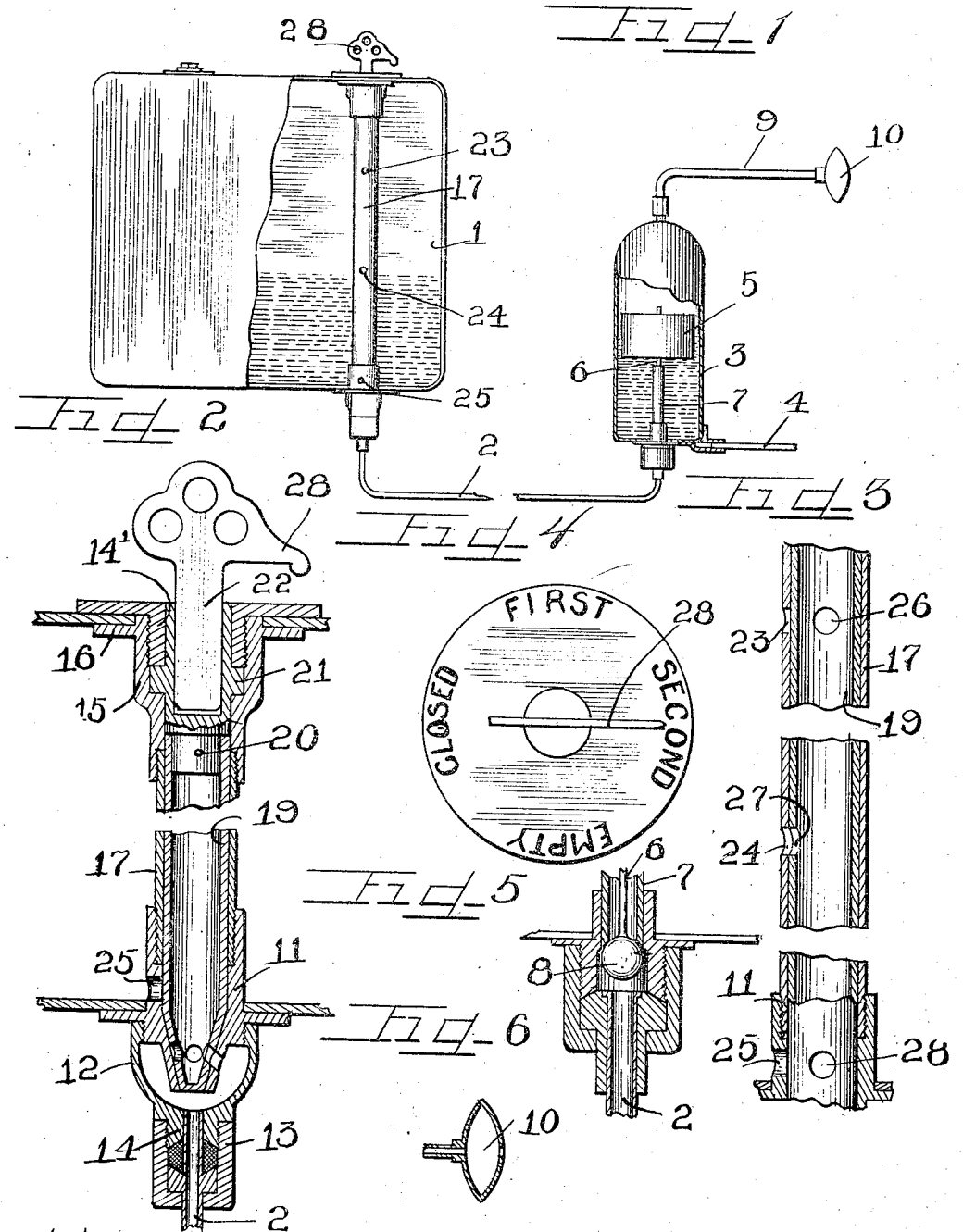

UNITED STATES PATENT OFFICE.

THOMAS VAN TUYL, OF KANKAKEE, ILLINOIS, ASSIGNOR TO ALBERT E. COOK, OF ODEBOLT, IOWA.

SUPPLY AND FEED SYSTEM FOR HYDROCARBON-ENGINES.

1,098,138.  Specification of Letters Patent.  Patented May 26, 1914.

Application filed December 19, 1910. Serial No. 598,248.

*To all whom it may concern:*

Be it known that I, THOMAS VAN TUYL, a citizen of the United States, and a resident of the city of Kankakee, in the county of Kankakee and State of Illinois, have invented certain new and useful Improvements in Supply and Feed Systems for Hydrocarbon-Engines; and I do hereby declare that the following is a full, clear, and exact description of the same, reference being had to the accompanying drawings, and to the numbers of reference marked thereon, which form a part of this specification.

It is a common experience in the use of the automobile and the launch for error in calculation in the rate of use of the hydrocarbon to result in the consumption of all the supply before warning of any kind is given the operator, thus frequently causing vexatious delays and sometimes even considerable danger.

It is the object of this invention to afford a hydro-carbon storage and feed system of such a construction as to insure warning being given to the operator while still a sufficient supply of the hydro-carbon remains in the tank to enable a run of a considerable distance to be made before refilling.

It is also an object of the invention to afford a device in connection with the fluid and supply system whereby an audible signal will be given the operator before the supply of hydro-carbon is exhausted.

It is a further object of the invention to afford a storage tank or container provided with a valve or valves so arranged as to necessitate adjustment of the valve or valves when a predetermined quantity of hydrocarbon fluid has been withdrawn from the tank to permit an additional quantity to be drawn therefrom.

It is further an object of the invention to afford in a device of the class described a float feed receptacle connected immediately to supply the engine and provided with means affording an audible signal when the supply of hydro-carbon is exhausted therefrom and to afford in connection therewith a storage or supply tank provided with a plurality of valves, each permitting but a portion of the contents of said tank to be withdrawn therethrough without adjustment of the valve.

The invention consists in the matters hereinafter described and more fully pointed out and defined in the appended claims.

In the drawings: Figure 1 is a side elevation partly broken away of a simple form of a device embodying my invention. Fig. 2 is an enlarged fragmentary longitudinal section of the valves and the operating means therefor. Fig. 3 is a similar fragmentary longitudinal section of the valves. Fig. 4 is a top plan view of the indicator. Fig. 5 is an enlarged sectional view of the check valve for the float feed supply receptacle. Fig. 6 is a transverse section of the whistle. Fig. 7 is a fragmentary sectional view of a modified form of the supply tank valve. Fig. 8 is a similar view showing a slightly different arrangement of the plug valve. Fig. 9 is a fragmentary sectional view of a further modification of the valves for the supply tank. Fig. 10 is a fragmentary bottom plan view thereof.

As shown in the drawings: The supply tank 1, is provided with suitable valves whereby the contents of the tank cannot be wholly discharged with one setting of the valve. The discharge pipe 2, of the valve is connected to a float feed reservoir 3, connected by means of a pipe 4, with the carbureting device for the engine. Said float feed reservoir contains therein a float 5, secured to which is a stem 6, which extends downwardly in a tube 7, co-axially with the inwardly directed end of the supply pipe 2, and, as shown, the upwardly directed end of the supply pipe and the downwardly directed end of the pipe or sleeve 7, serve as valve seats on which engages a ball closure 8, at either limit of movement of the travel of the float, as shown in Figs. 1 and 5. Thus, when the supply of gasolene in the reservoir rises above normal, the upward movement of the float serves to close the valve, discontinuing the inflow to the reservoir.

Connected in the upper end of the reservoir 3, is a pipe 9, provided on its extremity with a whistle 10, of familiar form. Secured in the bottom of the tank 1, is a flanged fitting 11, the upper end of which projects within the tank and which is provided at its lower end beneath the tank with a tapered peripherally apertured nozzle. Screwed on the lower end of the fitting to inclose said nozzle is a metallic cup 12, into the bottom of which opens the supply pipe 2, which is secured thereto by means of a suitable union 13, which threads upon a threaded boss 14, on said cup and which is apertured to receive the supply pipe therethrough. A corresponding fitting 15, provided with a flange 16, which fits beneath the top of the can, is secured in place, by means of a flanged and threaded collar 14', which threads in the upper open end of said fitting, as shown in Fig. 2, and threaded into each of said fittings and connecting the same is a cylindric pipe 17. Rotatable in said pipe 17, and fitting closely therein is a cylindric pipe 19, having the end thereof tapered as before described with reference to the nozzle on the pipe 17, and rigidly secured in the upper end thereof is a plug or stopper 20, provided with a peripheral flange 21, which engages beneath the flange of the threaded collar 14', and as shown, said plug is provided with a key slot to receive therein the key 22, for rotating the same.

The outer pipe 17, is provided with an aperture 23, as shown approximately at one third the depth of the tank below the top, a second aperture 24, at approximately one third the depth of the tank above the bottom and near the bottom thereof and extending through the fitting 11, is an aperture 25. In a similar manner, the inner pipe 19, is provided with an aperture 26, to correspond with the aperture 23, in the external pipe, and an aperture 27, corresponding with the aperture 24, in the outer pipe and with an aperture 28, corresponding with the aperture 25. Said apertures are so arranged in the respective pipes that but one of the apertures in the pipe 19, can register with the corresponding aperture in the pipe 17, at the same time, that is to say, when the aperture 26, is adjusted to register with the aperture 23, the remaining apertures in the pipe 19, are out of register with the remaining apertures in the pipe 17, and this is true also when any other of the apertures of said pipe are in register with its corresponding aperture in the outer pipe.

In practice, after the storage tank 1, is nearly filled with gasolene, air under pressure is forced therein to exert sufficient pressure on the contents thereof to discharge the same into the feed reservoir. Marked upon the top of the tank surrounding the key aperture, and, if preferred, upon the flange of the collar 14, are the words "Closed," "First," "Second" and "Empty" arranged ninety degrees (90°) apart, and the key, as shown, is provided with a laterally directed projection or indicator 28, which serves as a pointer to indicate the quantity of gasolene remaining in the tank. When the tank is full, the key is inserted with the point 28, directed over the word "Closed" and the key is then turned to first position or at a right angle with its starting position, thereby bringing the aperture 26, in the inner tube in register with the aperture 23, in the outer tube, and permitting the gasolene or other hydro-carbon from the tank to flow therethrough and downwardly to the float feed reservoir. The two interfitting pipes serve as a valve to close the apertures 24 and 25 in the outer pipe, inasmuch as the apertures in the inner pipe are not then in register therewith. In consequence, when the supply of hydro-carbon has fallen sufficiently low to permit the aperture through which the gasolene is flowing to the float feed reservoir to be uncovered, the air flows into said pipe, connecting pipe 2 and float feed reservoir and escaping therefrom through the pipe 9 and whistle 10, gives an audible signal to indicate the necessity of the operator for providing for a further supply of gasolene. This is accomplished by adjusting the key for the point to indicate "Second" position. The flow now passes from the supply tank through the apertures 27 and 24, and in a similar manner an audible signal will be afforded when the level of the gasolene or hydro-carbon in the tank has fallen so low that a supply of the gasolene no longer is maintained for the float feed reservoir. The operator now knows that his available supply of gasolene is small and adjusts the key to point to "Empty," which indicates the adjustment of the valves to permit the entire contents of the gasolene supply tank to be drained therefrom. In each instance, however, a sufficient supply of hydro-carbon remains in the float feed reservoir to continue the operation of the engine sufficiently long after the audible signal is afforded to permit the operator to adjust for an additional supply before the engine will stop for lack of fuel. When the signal is heard on the second adjustment and the operator adjusts to "Empty" position, he is thereby warned to make the earliest possible provision to secure an adequate supply of hydro-carbon before the limited quantity remaining in the supply tank be exhausted. Of course, it is quite immaterial what arrangement and particular type of valves be employed in so regulating the flow of the hydro-carbon fluid from the supply tank to the motor or engine. Numerous ways will readily suggest themselves, as, for instance, a plug valve casing 29, is secured in the wall of the supply tank near the bottom thereof and communicating with said casing is an upwardly directed, open ended pipe 30, which extends to approximately the middle of the tank or to a point where a sufficient supply of the hydro-carbon is still available for use to avoid annoying delays, even after the whistle signal is heard.

The valve casing 29, is apertured from the top inwardly to the bore and from the bottom upwardly to the bore. Seated in said casing is a rotatable plug valve 31, provided with an actuating lever 32; and, as shown, said plug valve is bored to afford a passage 33, from near the smaller end thereof outwardly beyond the walls of the tank and thence communicating through an aperture in the side of the plug and the peripheral passage 31ª with the gasolene feed pipe 2. The aperture 34, is provided through the side of the plug to register with either the upper or lower apertures in the plug valve casing, depending upon the adjustment of the plug. The construction illustrated in Fig. 8 is substantially the same, excepting that the plug valve casing 35, is secured in the bottom of the tank instead of the side or end thereof, and projects straight upwardly thereinto. The plug 36, extends upwardly and fits in the casing and extends at its inner end therethrough and into the tank, and secured on said inner end is an upwardly extending tube 37, the length of which, as before described, is sufficient to insure a reasonable amount of gasolene in the tank after the flow thereof ceases through the top of said tube. The aforesaid plug 36 is provided with a peripheral groove 36ª, which affords communication between the inner bore of the plug and the pipe 2 through an aperture in the fitting 35, as shown in Fig. 8, and as similarly described with reference to the plug 34 of Fig. 7. As shown also, a pin 39, extends through said pipe 37, and upper tube to rigidly connect the same together. Of course, an audible signal is provided to warn the operator of the deficiency of the fuel supply and this is operated through the medium of a float feed reservoir, as before described.

In the construction illustrated in Figs. 9 and 10, the tank 40, is provided in the bottom thereof with two casings 41 and 42, which open upwardly into the tank and seated in each of the same is a conical plug valve closure such as before described, bored to afford the one a passage for the gasolene flowing from near the top of the tank and the other bored to afford a passage for the gasolene to permit the same to flow from the bottom of the tank. A pipe 43, connects the casings of said valves and is in turn connected with the gasolene supply pipe 2. Of course, I am well aware that the particular form and arrangement of the valves is quite immaterial for any of the well known and suitably constructed valves upon the market might be constructed to suffice for the purpose indicated. Preferably, however, a device such as described should be at all times subject to the immediate and convenient control of the operator and any valve suited for this purpose will suffice. I therefore do not purpose limiting this application for patent otherwise than necessitated by the prior art.

I claim as my invention:

1. A device of the class described comprising a fuel tank adapted to feed fuel by compressed gas pressure, an outlet valve in the tank having a plurality of inlet ports adapted to communicate with the interior of the tank at different levels, and means for placing any one of said ports in communication with said tank, a maintained oil level reservoir connected to said valve, and means for producing an audible signal connected to said reservoir whereby when the liquid level in the tank falls to the level of the outlet through which it is being drawn the gas escaping from the tank will actuate said signal means.

2. A gasolene supply tank adapted to deliver fuel under gas pressure, a valve connected therein and capable of adjustment to draw predetermined quantities of the contents of the tank therefrom, a maintained oil level feed reservoir connected therewith, and means connected to the reservoir for affording an audible signal when the predetermined quantity has been withdrawn.

3. A device of the class described embracing a supply tank, a flanged fitting secured in the bottom of the tank and having one end thereof apertured and projecting into the tank and the other end tapered to afford a peripherally apertured nozzle, a second fitting secured in the top of the tank, a cylindric pipe connecting said fittings and apertured at different distances from the bottom of the tank, a similarly apertured pipe rotatably secured in said first mentioned pipe and having the lower end thereof apertured and tapered to correspond with the first mentioned fitting, means secured in the upper end of the rotatable pipe adapted to adjust the same to permit any one of the apertures in the same to register with the corresponding aperture in the outer pipe to permit predetermined portions of the contents of the tank to be withdrawn.

4. The combination with the main supply tank adapted to be connected to a source of gas under pressure of a measuring discharge valve connected therein, an auxiliary reservoir connected with said discharge valve, and signal means connected with said auxiliary tank and operated by the gas under pressure from the supply tank when measured quantities of the fuel have flowed therefrom.

In testimony whereof I have hereunto subscribed my name in the presence of two subscribing witnesses.

THOMAS VAN TUYL.

Witnesses:
 LAWRENCE REIBSTEIN,
 CHARLES W. HILLS, Jr.